(12) United States Patent
Valembois

(10) Patent No.: US 10,160,167 B2
(45) Date of Patent: Dec. 25, 2018

(54) METHOD FOR MANUFACTURING A RING-SHAPED FRAME

(71) Applicant: CONSEIL ET TECHNIQUE, Lauzerville (FR)

(72) Inventor: Guy Valembois, Lauzerville (FR)

(73) Assignee: CONSEIL ET TECHNIQUE, Lauzerville (FR)

( * ) Notice: Subject to any disclaimer, the term of this patent is extended or adjusted under 35 U.S.C. 154(b) by 0 days.

(21) Appl. No.: 15/747,427

(22) PCT Filed: Aug. 10, 2016

(86) PCT No.: PCT/FR2016/052060
§ 371 (c)(1),
(2) Date: Jan. 24, 2018

(87) PCT Pub. No.: WO2017/029445
PCT Pub. Date: Feb. 23, 2017

(65) Prior Publication Data
US 2018/0215107 A1    Aug. 2, 2018

(30) Foreign Application Priority Data
Aug. 14, 2015  (FR) ..................... 15 70023

(51) Int. Cl.
*B29C 70/22* (2006.01)
*B29C 70/46* (2006.01)
*B29B 11/16* (2006.01)
*B29L 31/00* (2006.01)
*B29C 70/48* (2006.01)

(52) U.S. Cl.
CPC ............ *B29C 70/222* (2013.01); *B29B 11/16* (2013.01); *B29C 70/462* (2013.01); *B29C 70/48* (2013.01); *B29L 2031/005* (2013.01); *B29L 2031/006* (2013.01); *B29L 2031/7096* (2013.01)

(58) Field of Classification Search
CPC ..... B29C 70/222; B29C 70/462; B29C 70/48; B29B 11/16; B29L 2031/005; B29L 2031/7096; B29L 2031/006
See application file for complete search history.

(56) References Cited

U.S. PATENT DOCUMENTS

2012/0100321 A1    4/2012  Goering
2015/0225087 A1    8/2015  Tanaka

*Primary Examiner* — Michael C Miggins
(74) *Attorney, Agent, or Firm* — Andrew W. Chu; Craft Chu PLLC

(57) ABSTRACT

A method for manufacturing a ring-shaped frame made from composite material includes slipping at least one tubular casing of dry fibers over an assembly having at least two coaxial sub-assemblies axially movable relative to one another and between which a peripheral groove is defined. The assembly is disposed in the general plane of the frame. A portion of the tubular casing is forced into the groove and the two sub-assemblies are tightened so as to hold a portion of the tubular casing in the groove. Two parts of the casing that are outside the groove are coupled, and the obtained coupling is folded onto one of the two sub-assemblies in order to obtain a preform of dry fibers. The preform is solidified by polymerization.

9 Claims, 4 Drawing Sheets

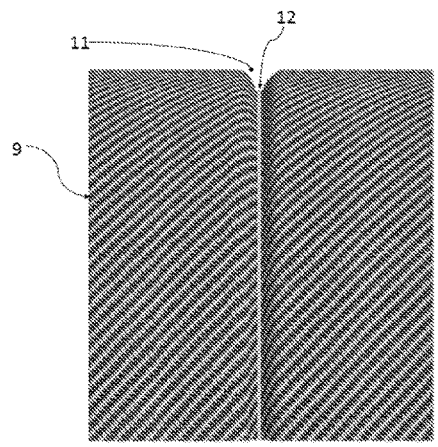 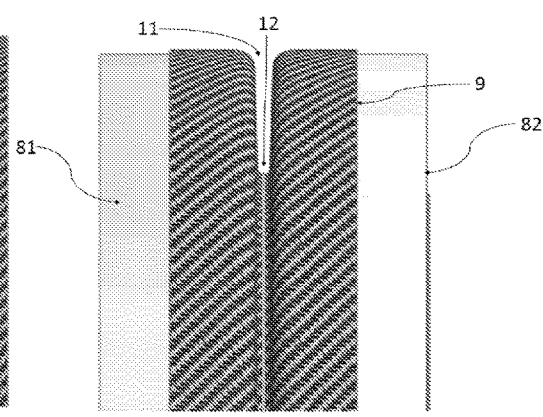
FIG. 3A					FIG. 3B
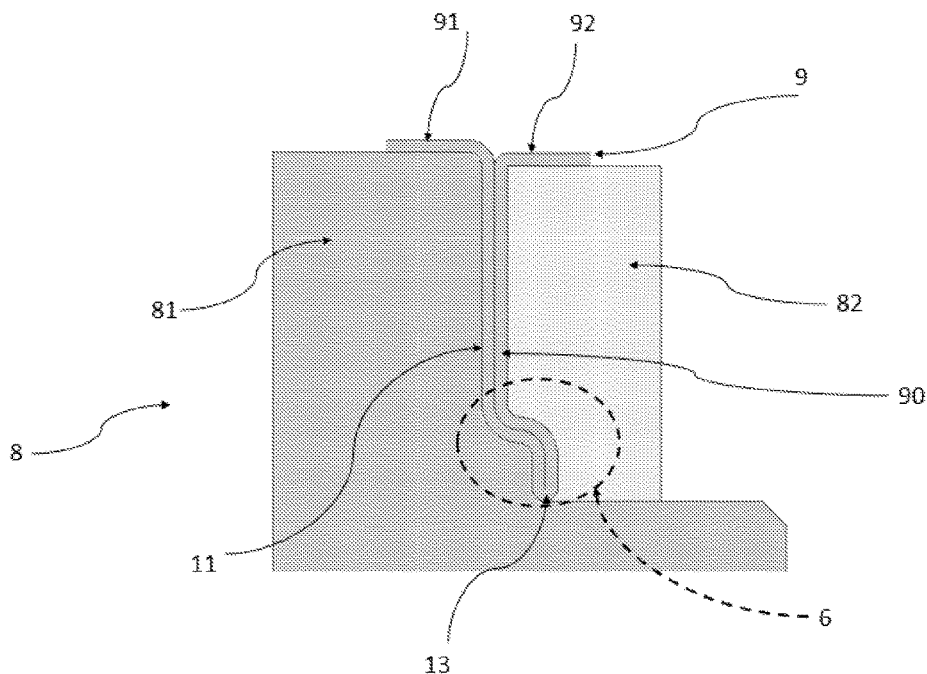
FIG. 4A

METHOD FOR MANUFACTURING A RING-SHAPED FRAME

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of parts made from composite material, comprising a reinforcing material based on fibers, dry or pre-impregnated, in a synthetic resin matrix. present invention relates to the field of the management of the incontinence under stress, and in particular, but not exclusively, of the urinary incontinence.

The present invention will primarily be applicable in the field of manufacturing composite annular frames, in particular frames for portholes intended for example to equip the fuselage of aircraft, and more particularly airplanes, said fuselage generally also being made from a composite material.

2. Description of Related Art Including Information Disclosed Under 37 CFR 1.97 and 37 CFR 1.98

An aircraft portal frame traditionally has a round or preferably oval shape, and said frame is not contained in a single plane; it is curved, such that it can best adapt to the cylindrical shape of the fuselage of the apparatus.

Porthole frames, in particular on an airplane, must perform several functions.

On the one hand, they are intended to be fastened to the fuselage of the apparatus and in turn allow the portal to be fastened via a sealing gasket.

On the other hand, the porthole frames must have excellent characteristics, in particular in terms of strength and rigidity, and allow a maintenance of perfect sealing between the inside and the outside of the fuselage of the apparatus.

Secondarily, the porthole frames provide a certain surface continuity with the fuselage of the aircraft, thus favoring the aerodynamic and acoustic properties of the apparatus. Furthermore, the porthole frames facilitate mounting of the glass element of the porthole.

Consequently, in the production of a portal frame for an aircraft, it is necessary to respect a certain number of constraints.

More particularly, interfaces between the frame of the porthole and other parts of the fuselage or the apparatus must be present.

A perspective view of one example embodiment of a portal frame 10 is shown in FIG. 1A. Said interfaces are shown in detail, shaded gray, in the attached FIG. 1B, showing a cross-sectional view of the portal frame 10, for easier understanding of the issues that arise.

Thus, for example, the inner surface of the zone 1 of the portal frame 10 is intended to cooperate with the seal of the porthole.

The heel, outer surface of the zone 2, must limit the dead space with the fuselage of the apparatus, and also allows pre-positioning of the portal frame 10 on the fuselage of the latter.

The zone 3 receives piercings for fastening the portal frame 10 on the fuselage of the aircraft.

The inner surface of the zone 4, at the free end of the cylindrical skirt 16 of the frame 10, is intended to bear on the gripping part of the porthole.

Lastly, the outer surface of the zone 5 ensures surface continuity between the porthole and the fuselage of the aircraft, in order to guarantee the acoustic and aerodynamic properties of the latter.

To manufacture a portal frame made from a composite material, methods are known consisting of producing several preforms individually. These preforms are next gathered, and the assembly is consolidated in an appropriate mold, by injecting resin and hardening.

However, these methods have a large number of steps and may prove complex to carry out. Furthermore, the junction zones between the various preforms may have weaknesses.

Also known, from international patent application WO 2013/139714, is a method for manufacturing a portal frame made from composite material with fibrous reinforcement.

The portal frame here consists of a profile whose section is substantially T-shaped and comprises three wings extending in concurrent directions, defining a core and a base.

In order to obtain the porthole frame, several steps are carried out. First, a tubular fibrous preform, or sock, is made, using a plaiting method. The tubular sock is next flattened, so as to form a flat tubular band, and multiple flat bands are then applied on a first face of a tool to make up the core of the porthole frame.

According to a first preforming step, a portion of certain strips is folded down on a second face of a tool. In a second preforming step, a portion of other strips is folded down on a third face of the tool. These preforming steps are intended to allow the establishment of the base of the frame, which is completed by a draping step using reinforcing folds.

The obtained fibrous preform is next consolidated, for example by resin injection or infusion.

However, the method according to this document includes several preforming steps, and also poses junction problems between the two ends of the frame obtained after consolidation of the preform.

Also known from document US 2012/225087 is a method in particular for manufacturing a window frame, a wheel rim, or a combustion chamber, which requires special weaving of a complex tubular shape comprising several diameters along a length thereof.

This method is complicated to implement and requires nonstandard tubular preforms.

Patent document WO 2011/041435 describes the production of a portal frame for an aircraft having a cross-sectional shape comprising a straight portion on the outer side, and a so-called "joggle" portion, and making it possible to seal the portal frame to the fuselage of the aircraft.

In this method, the initial preform is flat, and includes conventional carbon fibers at one end and so-called stretch broken carbon fibers at another end. The preform is compressed in a mold to impart the desired shape to the final frame.

A large number of steps must be carried out in this method, which results in making it complex. Furthermore, using this method, it is particularly difficult to obtain a part having a constant thickness over the entire section. Lastly, issues also arise here of the junction between the two ends of the obtained preform.

Furthermore, in general, the applicant has shown some of the shortcomings in the fibrous inner structure of the portal frames available in the state of the art.

More particularly, at the surface 6, called "junction zone", due to its proximity to the joint of the portal, analyses in the positioning of the fibers, using microscopy after taking a cross-section of the frame, have shown an accumulation of changes of direction of said fibers, having fairly sharp angles, as well as significant variations in thickness.

As a result, this makes the proper placement of the fibers, which will tend to migrate toward the inside of the angles, on the one hand, and the correct pressing of the fibers through external pressing, on the other hand, very hypothetical.

Furthermore, at the surface 7, or "bend zone", a folding problem of the fibers arises.

This tends to create a substantial decrease in the mechanical characteristics of the portal frames, drawback which must be resolved, in light of the safety constraints that must be met for this type of part.

BRIEF SUMMARY OF THE INVENTION

Consequently, the present invention proposes to resolve the issues traditionally encountered in the portal frames of the state of the art, in particular regarding the positioning of the fibers, in order to improve the mechanical characteristics of the portal frames. The method according to the invention also makes it possible to manufacture a single-piece ring-shaped frame, thus avoiding any problem with weakness of the part at a junction.

To that end, the invention relates to a method for manufacturing a ring-shaped frame made from composite material and comprising at least the following steps:
  slipping at least one tubular casing of dry fibers over an assembly comprising at least two coaxial subassemblies that are axially movable relative to one another and between which a peripheral groove is defined, disposed in the general plane of said frame, the plane of symmetry of said groove being perpendicular to said tubular casing;
  forcing a portion of the tubular casing into said groove provided between the two subassemblies and tightening said two subassemblies so as to hold said portion of the tubular casing in said groove;
  coupling the two parts of the casing that are outside the groove, and folding the obtained coupling onto one of the two subassemblies to obtain a preform of dry fibers;
  solidifying said preform by spraying resin or injecting resin, then applying special temperature and pressure conditions allowing polymerization of said resin.

The invention further relates to a method for manufacturing a ring-shaped frame made from composite material and comprising at least the following steps:
  slipping at least one tubular casing of fibers pre-impregnated with a resin over an assembly comprising at least two coaxial subassemblies that are axially movable relative to one another and between which a peripheral groove is defined, disposed in the general plane of said frame, the plane of symmetry of said groove being perpendicular to said tubular casing;
  forcing a portion of the tubular casing into said groove provided between the two subassemblies and tightening said two subassemblies so as to hold said portion of the tubular casing in said groove;
  coupling the two parts of the casing that are outside the groove, and folding the obtained coupling onto one of the two subassemblies to obtain a preform of pre-impregnated fibers;
  solidifying said preform by applying special temperature and pressure conditions allowing polymerization of said resin.

According to one alternative of the method according to the invention, the phase for coupling the two parts of the casing that are outside the groove is replaced by a phase where one of said two parts of the casing is stood up, in the extension of said plane of symmetry of the groove, and said parts, which form an angle between them, are coupled to a strip of material with dry fibers or fibers pre-impregnated with a resin.

Advantageously, the bottom of the groove has a curve similar to the inner edge of said frame to be manufactured.

According to another particularity of the invention, said assembly is made up of a mandrel and a counter-mandrel.

According to another particularity of the invention, the casing is forced into the groove using a wired element configured in a loop and gripped in said groove until it pushes said casing against the bottom.

Interestingly, several tubular casings are superimposed on said assembly.

The present invention has many advantages. On the one hand, the described method is simple, effective and particularly cost-effective. It makes it possible to obtain a frame with a quasi-constant thickness over its entire section by producing a single basic preform, at a lower cost. Furthermore, the thickness of the frame can be controlled easily using the superposition, if necessary, of a plurality of tubular casings with dry or pre-impregnated fibers. Moreover, the inventive method is completely compatible with a rotational molding method for injecting liquid resin.

The method according to the invention also guarantees the production of parts with particularly interesting mechanical characteristics, in particular in terms of strength and rigidity, due to the preservation of an orientation of fibers, or a superposition of orientations of fibers.

Another advantage lies in the fact that, using this method, the inner edge of the preform is made without cutting fibers, thereby improving the quality of the sealing lip forming the junction between the portal frame and the joint of the porthole.

BRIEF DESCRIPTION OF THE SEVERAL VIEWS OF THE DRAWINGS

Other features and advantages of the invention will emerge from the following detailed description of non-limiting embodiments of the invention, in reference to the appended figures.

FIGS. 2A-4C illustrate, schematically, one preferred embodiment of the various steps carried out during the inventive method.

FIGS. 2A and 2B are schematic views of the placement of two subassemblies in one assembly, defining a groove between said two subassemblies, and slipping a tubular casing of plaited fibers on said assembly.

FIGS. 3A and 3B are schematic views of positioning a gripping means to force a portion of said tubular casing into the groove and the symmetrical migration of a portion of the casing toward the bottom of the groove by applying a pulling force on the gripping means.

FIGS. 4A-4C are cross-sectional views of the portion of the tubular casing filling the groove of the assembly, the bottom of said groove having a curve similar to the curve of the inside of the frame to be produced, in FIG. 4A, coupling of the two parts of the tubular casing that are not in the groove, in FIG. 4B and folding the latter down, using a tool, on one of the faces of one of the subassemblies making up the assembly, illustrated in FIG. 4C.

DETAILED DESCRIPTION OF THE INVENTION

Figure 1A:
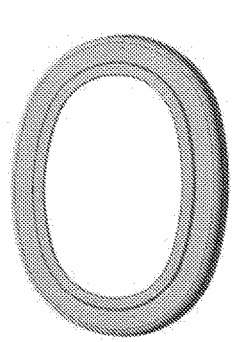
FIG. 1A schematically shows a perspective view of a ring-shaped portal frame intended to equip an aircraft.
Figure 1B:
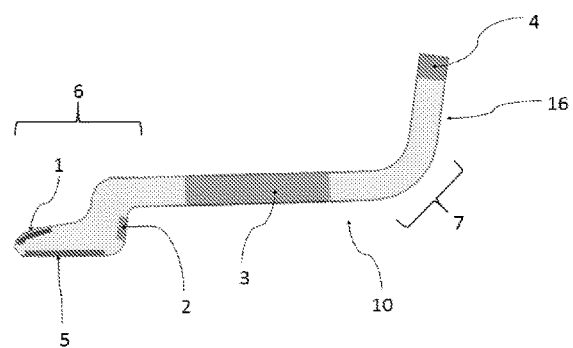
FIG. 1B shows a cross-sectional view of said frame, showing the different interfaces between this frame and other elements of the apparatus.

The present invention relates to a method making it possible to produce a ring-shaped frame 10, substantially round or preferably oval, made from composite material, said frame 10 being illustrated in FIG. 1.

Preferably, the ring-shaped frame 10 obtained by carrying out the various steps of the present method is intended to equip the fuselage of aircraft engines, more particularly still the fuselage of airplanes, said fuselage advantageously in turn being able to be made from a composite material.

Figure 2A:
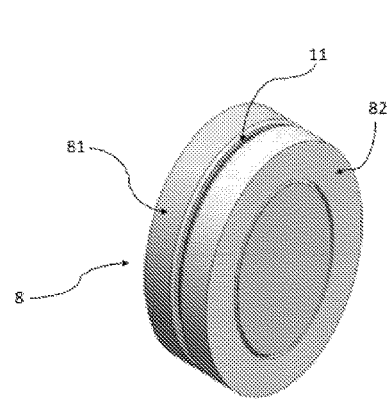
Figure 2B:
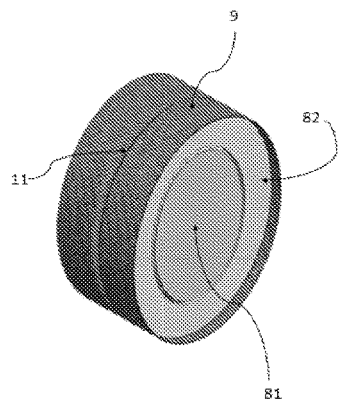

In reference to FIGS. 2A and 2B, in a first step of the method, at least one tubular casing 9 of fibers, of the sock type, is slipped onto an assembly 8, the latter preferably having a globally cylindrical shape and comprising at least two subassemblies 81, 82.

Said tubular casing 9 is advantageously made up of plaited fibers, for example made from glass, polyamide or preferably carbon, dry or pre-impregnated with a polymer resin.

The tubular casings 9 made from plaited carbon are particularly advantageous, because said plaits have a controllable deformability.

Furthermore, many different diameters are commercially available, depending on the perimeter of the ring-shaped frame 10 that one wishes to produce.

Figure 6:
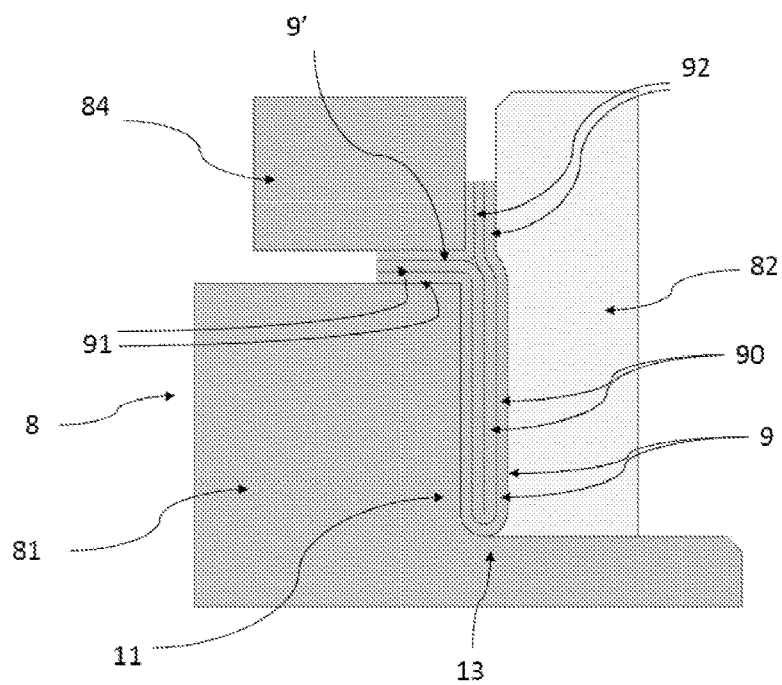
FIG. 6 illustrates another schematic view of an embodiment of a frame according to the invention.

In one interesting embodiment, not shown in the figures, it is possible to consider slipping, on the assembly 8, several superimposed tubular casings 9, as shown in FIG. 6.

This advantageously makes it possible to choose the thickness of the section of the frame 10 to be produced depending on the imposed constraints. Furthermore, it is also possible to consider stacking several plaited tubular casings 9 each having a particular and complementary orientation of the fibers.

The orientation of the fibers within the tubular casing 9 depends, on the one hand, on the perimeter of the shape on which said casing 9 is constrained, in the case at hand the perimeter of the assembly 8, and on the other hand, the diameter of the casings 9.

Consequently, a careful choice of casings 9 with different diameters makes it possible to have different and complementary fiber orientations in order to obtain a quasi-isometric homogeneous assembly.

In one preferred embodiment, prior to the placement of at least one tubular fiber casing 9 on the assembly 8, said casing 9 is cut so that the latter has the appropriate length for the production of the ring-shaped frame 10.

Said two subassemblies 81, 82, on which at least the tubular casing 9 is slipped, and making up the assembly 8, are movable relative to one another. Generally, one of the two subassemblies 82 is guided relative to the second subassembly 81, which in turn remains stationary.

In one interesting example embodiment, shown in the figures, said two subassemblies consist of a mandrel 81 and a counter-mandrel 82, the latter being guided on said mandrel 81, and the tubular casing 9 is mounted on the outer surface of the mandrels 81, 82.

It will be understood that the general shape of the assembly 8 must correspond to the shape of the ring-shaped porthole frame 10 that one wishes to produce using the present method.

Between the two subassemblies 81, 82, preferably a mandrel 81 and a counter-mandrel 82, a peripheral groove 11 is defined, which is in the general plane of the ring-shaped frame 10, and the plane of symmetry of which is perpendicular to said tubular casing 9 when the latter is slipped on the assembly 8.

In reference now to FIGS. 3A and 3B, the following step consists of forcing a portion 90 of the tubular fiber casing 9 to migrate inside the groove 11.

Particularly preferably, this step is carried out via a tightening means 12 able to consist of a link of the fishing line type, in particular.

Said tightening means 12 is advantageously positioned circumferentially, outside the tubular casing 9 and substantially in the plane of symmetry of the peripheral groove 11.

Figure 4B:
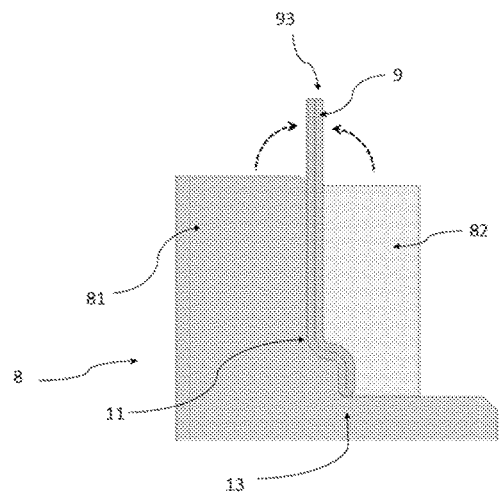

In reference to FIGS. 3B and 4B, the application of a pulling force on the tightening means 12 causes the portion 90 of the tubular casing 9 to migrate toward the bottom 13 of the groove 11, symmetrically relative to the plane of symmetry of said groove 11.

Particularly advantageously, the bottom 13 of the groove 11 defined between the subassemblies 81, 82 has a shape, or curve, similar to that of the frame 10 to be produced.

Figure 4C:
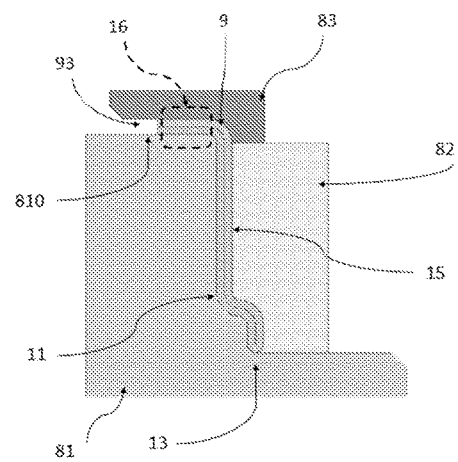

Thus, in the embodiment shown in FIGS. 4A to 4C, said bottom 13 of the groove 11 has a sectional shape corresponding to the sectional shape of the junction zone 6 of the portal frame 10. This example is illustrated more particularly in FIG. 4A using the circle and the arrow in broken lines.

One then grips the two subassemblies 81, 82, for example the mandrel 81 and the counter-mandrel 82, so as to allow the portion 90 of the fiber casing 9 to be kept in the groove 9.

More specifically, one first applies slight gripping of the counter-mandrel 82 on the mandrel 81 during the migration of the tubular casing 9 in the groove 11, so as to maintain pressure on the part of the casing 11 that is already in said groove 11. The application of this pressure slightly opposes the movement of the casing 9 and makes it possible to maintain the tension in the fibers of said casing 9 during shaping thereof, in order to prevent any creasing thereof.

At the end of the operation, when the tubular casing 9 has reached the bottom 13 of the groove 11, the pressure between the mandrel 81 and the counter-mandrel 82 is increased, so as to block the tubular casing 9 in its final state, then the gripping means 12 is removed, for example by applying a simple pulling force at one of its two ends when said means 12 consists of a wire-type link.

At this moment in the method, a portion 90 of the tubular casing 9 is trapped within the groove 11, to the bottom 13 thereof, while part of said casing 9 has remained outside said groove 11, as shown in FIG. 4A.

More specifically, there are two parts 91, 92 of the casing 9, each of said two parts 91, 92, which consist of the extreme edges of the tubular casing, extending on either side of said groove 11, and globally symmetrically on each side thereof.

Said two parts 91, 92 of the casing 9 are then brought together, substantially in the plane of symmetry of the groove 11, in a coupling 93. This step is more specifically illustrated in FIG. 4B.

In reference now to FIG. 4C, said coupling 93 obtained on one of the two subassemblies 81, 82 is next folded down in order to form the cylindrical skirt 16 of the portal frame 10. In the case at hand, in the illustrated example embodiment, the coupling 93 is brought back onto the outer surface 810 of the mandrel 81.

Preferably, the coupling 93 is folded down using a tool 83 having a shape appropriate for the configuration of the casing 9 in the form of a cylindrical skirt 16, and one thus arrives at the preform 15 making it possible to obtain the ring-shaped portal frame 10.

In order to finalize the production of said frame 10, said preform 15 is solidified.

In the scenario where the preform 15 includes at least one tubular casing 9 of plaited fibers pre-impregnated with a polymer resin, the solidification of said preform 15 is done by simple placement under temperature and pressure conditions allowing the polymerization of said resin.

In the example embodiment where the preform 15 is made up of dry fibers, the latter is solidified by spraying or injecting polymer resin, then applying appropriate temperature and pressure conditions to allow said resin to polymerize.

It is possible to consider spraying, on the outer surface of the tubular casing 9, an epoxy resin spray, for example, once said casing 9 is slipped on the mandrel 81 and counter-mandrel 82 assembly, before carrying out the conformation steps of said casing 9.

This prior spraying operation advantageously makes it possible to give the preform 15 ultimately obtained the mechanical strength making it easier to manipulate, in particular when disassembling the mandrels 81 and 82, cutting operations if necessary, or during molding of said preform 15.

Indeed, the step for solidification of the preform 15 can be carried out using a process for low-pressure injection molding of liquid resin in a mold.

Furthermore, particularly advantageously, it is possible to consider producing the preform 15 directly in a mold, so as to be able to automate the production of the composite frames 10.

The present invention has been described more particularly in one preferred embodiment, for producing ring-shaped porthole frames 10 intended to equip aircraft, in particular airplanes.

However, the method described here must not be understood as being limited to the production of porthole frames, and it also defines, more generally, a new embodiment that is particularly interesting for obtaining, non-limitingly, frames that are generally ring-shaped and made with a base of composite material.

Figure 5A:
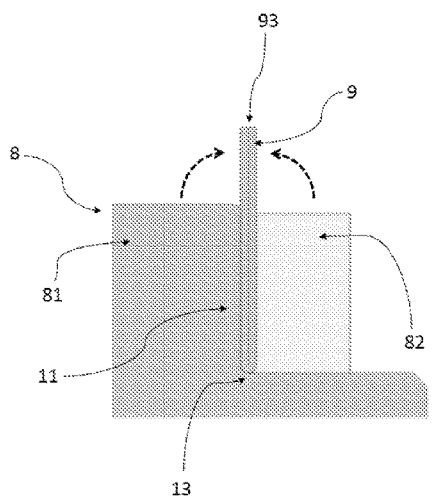
FIGS. 5A, 5B and 5C illustrate schematic views of a different embodiment in which the bottom of the groove is rectilinear and does not have any particular curvature, allowing the production of a frame with a different section.
Figure 5B:
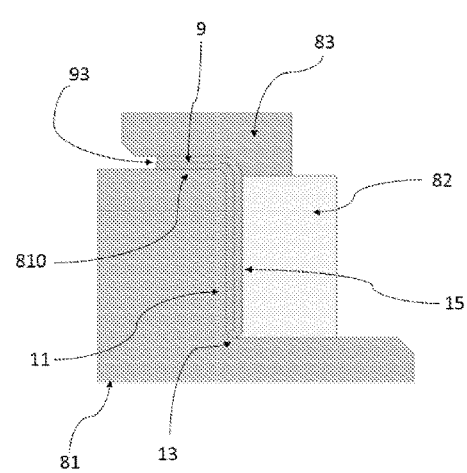
Figure 5C:
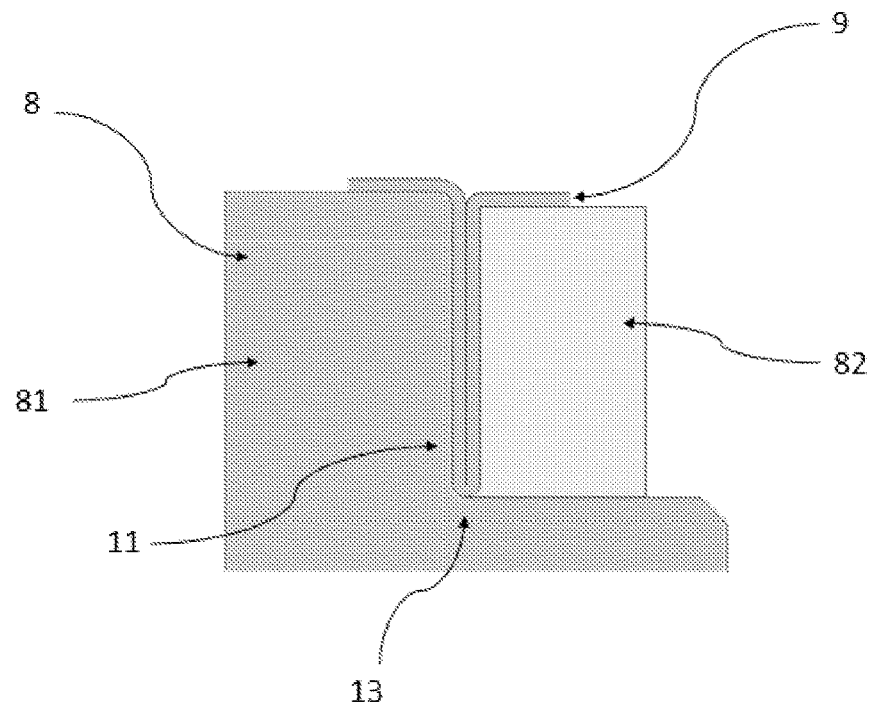

To that end, FIGS. 5A to 5C illustrate the manufacture of an annular frame with a simplified section relative to the frames intended to equip aircraft, without the particular conformation of the "junction zone" 6 with all of the imposed interfaces.

In this embodiment, the bottom 13 of the groove 11 is rectilinear, like the rest of said groove 11.

The method according to the invention is particularly interesting, since it makes it possible to produce an annular frame 10 in a limited number of operations, and without junction problems between several preforms, or between the two ends of a single and same preform, given that a continuous tubular casing 9 of fibers is used, said casing 9 being shaped on a globally cylindrical mandrel and counter-mandrel assembly.

In reference now to FIG. 6, one can see the implementation of the method according to the invention for producing a frame having a different section, and in particular according to that of the frame covered by document WO 2013/139714, namely T-shaped.

This shape is obtained by not gathering and coupling the two parts 91, 92 of the casing 9, after forcing the latter in the groove 11, but by standing up only one part, in this case the part 92, such that it forms an angle with the other part, in this case the part 91, while on the one hand a strip 9' of reinforcing material based on fibers, dry or pre-impregnated, in a synthetic resin matrix is coupled to said parts 91 and 92, and on the other hand, a tool 83 presses the strip 9' against the parts 91 and 92 simultaneously. The part 91 and the strip part 9' that is coupled to it thus constitute a peripheral part that protrudes from the rest of the frame.

Advantageously, the strip 9' consists of a tubular casing, slipped on the mandrel 81 and the part 91, and stood up in half against the part 92. The method according to the invention thus makes it possible to produce a frame with a T-shaped section, with no junction zone.

It should be noted, as already mentioned, that in this FIG. 6, the casing 9 is lined by a second casing 9, so as to increase the thickness of the frame accordingly. It is of course possible to superimpose more than two casings 9.

I claim:

1. A method for manufacturing, the method comprising the following steps:
   slipping at least one tubular casing of dry fibers over an assembly comprising at least two coaxial subassemblies that are axially movable relative to one another and between which a peripheral groove is defined, disposed in the general plane of said frame, the plane of symmetry of said groove being perpendicular to said tubular casing;
   forcing a portion of the tubular casing into said groove provided between the two subassemblies and tightening said two subassemblies so as to hold said portion of the tubular casing in said groove;
   coupling the two parts of the casing that are outside the groove, and folding the obtained coupling onto one of the two subassemblies to obtain a preform of dry fibers; and
   solidifying said preform by spraying resin or injecting resin, then applying special temperature and pressure conditions allowing polymerization of said resin.

2. The method for producing a frame, according to claim 1, wherein the bottom of the groove has a curve similar to that of the inner edge of said frame to be produced.

3. The method for producing a frame, according to claim 1, wherein said assembly is comprised of a mandrel and a counter-mandrel.

4. The method for producing a frame, according to claim 1, wherein the casing is forced into the groove using a wired element configured in a loop and gripped in said groove until it pushes said casing against the bottom.

5. The method for producing a frame, according to claim 1, wherein several tubular casings are superimposed on said assembly.

6. A method for manufacturing a ring-shaped frame made from composite material, comprising at least the following steps:
- slipping at least one tubular casing of fibers pre-impregnated with a resin over an assembly comprising at least two coaxial subassemblies that are axially movable relative to one another and between which a peripheral groove is defined, disposed in the general plane of said frame, the plane of symmetry of said groove being perpendicular to said tubular casing;
- forcing a portion of the tubular casing into said groove provided between the two subassemblies and tightening said two subassemblies so as to hold said portion of the tubular casing in said groove;
- coupling the two parts of the casing that are outside the groove, and folding the obtained coupling onto one of the two subassemblies to obtain a preform of pre-impregnated fibers;
- solidifying said preform by applying special temperature and pressure conditions allowing polymerization of said resin.

7. A method for manufacturing a ring-shaped frame made from composite material, comprising at least the following steps:
- slipping at least one tubular casing of dry fibers over an assembly comprising at least two coaxial subassemblies that are axially movable relative to one another and between which a peripheral groove is defined, disposed in the general plane of said frame, the plane of symmetry of said groove being perpendicular to said tubular casing;
- forcing a portion of the tubular casing into said groove provided between the two subassemblies and tightening said two subassemblies so as to hold said portion of the tubular casing in said groove;
- standing up, in the extension of said plane of symmetry of the groove, one of said two parts of the casing that are outside the groove, and coupling said parts, which form an angle between them, a strip of material with dry fibers;
- solidifying said preform by spraying resin or injecting resin, then applying special temperature and pressure conditions allowing polymerization of said resin.

8. The method for producing a frame, according to claim 7, wherein the strip of material consists of a tubular casing.

9. A method for manufacturing a ring-shaped frame made from composite material, comprising at least the following steps:
- slipping at least one tubular casing of fibers pre-impregnated with a resin over an assembly comprising at least two coaxial subassemblies that are axially movable relative to one another and between which a peripheral groove is defined, disposed in the general plane of said frame, the plane of symmetry of said groove being perpendicular to said tubular casing;
- forcing a portion of the tubular casing into said groove provided between the two subassemblies and tightening said two subassemblies so as to hold said portion of the tubular casing in said groove;
- standing up, in the extension of said plane of symmetry of the groove, one of said two parts of the casing that are outside the groove, and coupling said parts, which form an angle between them, a strip of material with fibers pre-impregnated with a resin;
- solidifying said preform by applying special temperature and pressure conditions allowing polymerization of said resin.

* * * * *